(12) United States Patent
Jauernik

(10) Patent No.: US 8,537,465 B2
(45) Date of Patent: Sep. 17, 2013

(54) APPARATUS FOR CHANGING DIFFRACTION GRATINGS

(75) Inventor: Paulus Jauernik, Kaarst (DE)

(73) Assignee: Sirah Lasertechnik GmbH, Grevenbroich (DE)

( * ) Notice: Subject to any disclaimer, the term of this patent is extended or adjusted under 35 U.S.C. 154(b) by 256 days.

(21) Appl. No.: 13/018,638

(22) Filed: Feb. 1, 2011

(65) Prior Publication Data
US 2012/0026587 A1   Feb. 2, 2012

(30) Foreign Application Priority Data
Feb. 1, 2010   (DE) .......................... 10 2010 006 526

(51) Int. Cl.
*G02B 5/18*   (2006.01)
*G02B 27/44*   (2006.01)

(52) U.S. Cl.
USPC .......................................................... 359/566

(58) Field of Classification Search
USPC .................................. 359/558–576; 372/109
See application file for complete search history.

(56) References Cited

U.S. PATENT DOCUMENTS

| 3,390,604 | A | * | 7/1968 | Makabe | 356/328 |
| 3,418,051 | A | * | 12/1968 | Staunton | 356/333 |
| 3,733,131 | A | * | 5/1973 | Mould | 356/334 |
| 4,027,975 | A | * | 6/1977 | Turner et al. | 356/334 |
| 5,767,965 | A | | 6/1998 | Zhou | |

* cited by examiner

*Primary Examiner* — Alessandro Amari
*Assistant Examiner* — Kimberly N Kakalec
(74) *Attorney, Agent, or Firm* — Andrew Wilford

(57) ABSTRACT

An apparatus usable with a laser resonator has a generally stationary base, a positioning slide carried on the guide and shiftable thereon in an adjustment direction, and two (or more) holders carried on the slide and each having a platform adapted to secure a respective diffraction grating. Each of the platforms can be shifted on the respective holder with at least two degrees of freedom relative to the slide. The positioning slide can also be shifted relative to the base for moving each of the gratings into a working position.

8 Claims, 6 Drawing Sheets

APPARATUS FOR CHANGING DIFFRACTION GRATINGS

FIELD OF THE INVENTION

The present invention relates to an apparatus for changing diffraction gratings. More particularly this invention concerns an apparatus for holding one or more diffraction gratings in a laser resonator or the like.

BACKGROUND OF THE INVENTION

In optics, optical gratings are used by a number of applications, as they have the property of spectrally spreading incident light by wave-dependent diffraction. Optical gratings can be used, for example, for limiting bandwidth, as well as for tuning wavelength frequency in lasers such as, for example, in dye lasers that can have laser activity in a large frequency range because of the dyes used.

The optical properties of a grating are dependent at least on the number of grating lines and can be further influenced, for example, by the so-called blaze angle of the individual grating steps, coatings, etc. Thus, the gratings used, for example, in a laser resonator, can be optimally selected for the respectively desired application, or the desired frequency range, with which work is to be done in an application, for example, in a laser.

Especially when a high frequency tuning range of a laser system is desired such as, for example, in the case of dye lasers, a range of 500 nanometers, it is known to be a problem that this frequency range cannot be covered by a single grating, as this grating does not have the required unchanging efficiency and sufficient optical properties for the required frequency range. If the same grating were used here for the entire frequency range, this would mean large compromises in the line width or in the efficiency of the laser operation.

In particular, laser resonators that do not work with a simple Littrow configuration of a grating as back reflector but work in grazing incidence using a first grating, the strongest configuration of which uses back reflection with a mirror or a second grating in Littrow configuration by the same grating back into the resonator, have a very small line width, which leads to small-banded resonators.

Such resonators with grazing incidence onto a grating have a so-called Wood anomaly that can lead to a situation in which the laser resonator has an oscillation build-up at certain wavelengths in an undesired polarization.

For this reason, it is necessary in optical apparatuses such as, for example, lasers or also spectrometers that are to be operated in a large, tunable frequency range that more than one grating is used, each of the gratings used being optimized for a respective frequency range.

To achieve this it was previously necessary to change gratings in order to, for example, change from a first to a second or also to additional frequency ranges. This switch was customarily done in that the grating used for wavelength selection is constructed, for example, by the laser resonator or spectrometer or another apparatus in a laborious way and a new grating is installed for the other desired frequency range, after which the optical apparatus had to be recalibrated in order to continue operation.

Solutions also became known in which gratings are arranged on grating carriers that can be fitted to a guide by aligning pins in a predetermined orientation. In spite of that, even with gratings changed in this way, no continuous operation, in particular no laser operation in various frequency ranges can be achieved without subsequent alignment of the gratings.

In addition to the required alignment after such a grating change it must further be considered that frequently, such a grating change is only reluctantly performed by a user and, to do so, a service technician is commissioned in order to do the job that requires time planning, down time of the optical apparatus, for example the laser system, and as a result considerable cost.

OBJECTS OF THE INVENTION

It is therefore an object of the present invention to provide an improved system for changing diffraction gratings.

Another object is the provision of such an improved system for changing diffraction gratings that overcomes the above-given disadvantages, in particular that allows a grating change with high precision and the small frequency errors resulting therefrom, in particular in an optical laser resonator, whereby compared to the previous grating changes a subsequent calibration is only required to a small extent, or preferably can be eliminated completely.

A further object of the invention is that such a grating change can be performed by the user without any mechanical or optical retrofitting steps, so that the use of a specialized service technician is not needed.

Yet another object is to provide a grating-changing apparatus with which at any time, as needed and in the desired frequency range, a grating change can be performed without any mechanical risk to a grating, as is otherwise often the case in manual handling of the sensitive surfaces of the gratings.

SUMMARY OF THE INVENTION

An apparatus usable with a laser resonator has according to the invention a generally stationary base, a positioning slide carried on the guide and shiftable thereon in an adjustment direction, and two (or more) holders carried on the slide and each having a platform adapted to secure a respective diffraction grating. Each of the platforms can be shifted on the respective holder with at least two degrees of freedom relative to the slide. The positioning slide can also be shifted relative to the base for moving each of the gratings into a working position.

Here, the core concept of the invention is to provide an apparatus that can be used in an optical apparatus, for example a laser resonator, and on which at least two different optical gratings are already secured and if necessary can subsequently be aligned in an easy way, and are ready for use. For example, for this, the base of this apparatus can be mounted on an optic bank of an optical apparatus (e.g. laser).

In order to ensure the direct use of each of the available gratings that are fixed to the grating platform of the respective grating holder, the grating-changing apparatus in accordance with the invention the grating platform of each of the grating holders to be adjusted so that each one of the gratings fixed to the grating platform can also be individually aligned, namely with at least two degrees of freedom, in a horizontal plane perpendicular to each other. These degrees of freedom affect, in particular, the alignment of the grating lines perpendicular to the resonator plane of a laser resonator, as well as the alignment of the grating surface perpendicular to the resonator plane, in order to guide the light diffracted by the grating exactly into the resonator plane.

Accordingly, with the grating-changing apparatus according to the invention there exists the possibility of making at least two gratings available on the positioning slide in the grating holders, to move each of the gratings by moving the positioning slide relative to the base into one, in particular always the same working position in which, for example, relative to the application, laser activity is possible in a laser and thus the operation can be switched directly by a first grating to a second grating.

As each of the gratings can be aligned individually within at least two degrees of freedom, for both gratings, alignment can be performed in the respective working position of the respective grating, so that after this alignment has taken place, switching of the optical apparatus can occur between the two gratings in any desired way, solely moving the positioning slide relative to the base with the two different gratings, preferably without having to perform a subsequent alignment. Accordingly, there exists the possibility here that the user of a laser can perform the grating change himself without the costly commissioning of a service engineer, when the users adjusts the positioning slide relative to the base in the desired way.

The respective grating holders that each hold a grating are thereby preferably designed in such a way that they each comprise a first part that is rigidly fixed to the positioning slide and a second part or platform to which the respective grating is secured and that can be adjusted with at least two degrees of freedom relative to this first part and thus can be aligned directly relative to the positioning slide or base or the optical apparatus, as all of these elements are rigidly connected with each other.

In a first possible embodiment the motion between positioning slide and base is a rotation for the purpose of positioning one of the at least two grating holders in the working position. For this the positioning slide is designed as a rotary disk that is fixed on the base rotatable around an axis of rotation. For example, detents are formed between the rotary disk and the base so that in the case of a rotation of the rotary disk a detachable catch mechanism between the carousel or rotary disk and base always engages when a grating holder and thus also the grating carried by it is arranged in the working position.

In a possible motor-driven setup for the rotary disk relative to the base element the different gratings are brought into the working position by activating a stepping motor rotates the disk with a specified number of steps, or to provide an coding between rotary disk and base, in order to be able to capture the angle of rotation in a motor-driven actuation and to hereby be able to rotate each of the several grating holders into the working position in a targeted manner.

This way, in particular in relation to the laser application an axis of rotation, around which a rotary plate is rotatable is parallel to the laser plane, and in this embodiment, the gratings then are arranged with their optical surfaces that have lines parallel to the surface of the rotary disk in the grating holders.

In a different embodiment the axis of rotation of the rotary disk is perpendicular to the resonator plane of the laser resonator, so that in such an embodiment then the gratings are fastened in the grating holders in such a way that the optical surfaces that have the lines are perpendicular to the rotary disk surface.

In a contrasting preferred alternative embodiment the positioning carriage is a slide that can be displaced in a straight line at the base by means of at least one linear guide. The motion of the positioning slide with respect to the base in a linear direction of motion hereby has, in contrast to the rotation, the advantage that the range of movement between the positioning slide designed as carriage and the base is not critical with respect to the height dimension of the gratings, as over this entire range, the optical effect of the grating is achieved in the laser resonator. Beyond that, the linear motion between carriage and base when using more than only a single linear guide can be designed significantly more precise than in the case of the rotating motion of a rotary disk around an axis of rotation.

In the embodiment of the changing apparatus according to the invention in which a carriage is provided that can be displaced in a straight line relative to the base that has at least two grating holders, for displacement of the base with its longitudinal axis parallel to the direction of displacement, a threaded spindle is provided that fits in a threaded bushing to the carriage. Such a threaded spindle can, for example, be operated manually or also by a motor, for example, a stepping motor. Of course, here too exists the possibility of using other drives in place of a threaded spindle by means of which the carriage can be displaced in a straight line by external manual or motor-driven effects with respect to the base. For example, a micrometer screw or fine-threaded screw can be used as drive, the end of which abuts the carriage and displaces the carriage against a resetting force, for example, against a spring.

In order to obtain an especially precise displacement between the carriage and the base, the base can, for example, be U-shaped and/or at least have a U-shaped part with the carriage located between guides formed by the U-arms and between the inner face of each guide and the respective opposite outer face of the carriage, a straight-line guide is located.

Hereby, the side surface of the carriage directed at a guide can be connected with this guide by a straight-line guide. As a result, a parallel configuration of two straight-line guides results which achieves a higher degree of precision than a single linear guide.

Thereby, for forming the linear guide in the interior of each guide of the U-profile there is a first track with a guide slot or groove that works together with balls held in a cage with a second track element with a guide slot or groove that is fixed at the carriage that is arranged between the guides. Thus, at the base as well as at the carriage, identical track elements are located respectively, in which balls run in opposite slots, so that these track elements can move past each other in the straight-line direction of displacement.

A particularly compact arrangement of the grating-changing apparatus in accordance with the invention results when the individual grating holders are arranged in a vertical stack of the direction of displacement, at a vertical spacing above each other, with the planes of the grating support face of a grating platform extending horizontally perpendicular to the direction of displacement. In such a configuration, the individual gratings fixed in the grating holders are on top of each other in such a way that their grating lines are vertically spaced, i.e. in height on top of each other and parallel to each other.

Due to the close spacing of the individual grating holders in the direction of displacement, in particular in the height, if necessary, the alignment elements that are provided for aligning the grating platform cannot be reached directly with tools. Here, to simplify the possibility of alignment, alignment elements for alignment of a grating platform of at least one grating holder are accessible with a tool through cutouts in a grating holder that is located above it.

In order to achieve this, the cutouts of an upper grating holder and an alignment element of a lower grating holder can be aligned vertically. Alignment elements can thereby be formed, for example, by adjustment screws that move the grating platform around a point of rotation against a spring tension. Such a point of rotation can, for example, be realized as a ball that is located between a grating platform and that part of the grating holder that is firmly connected with the positioning slide, or also has a different adjustment screw, in particular one that has a spherical end.

A firm connection between the grating holder and the positioning slide, for example, the carriage or also the rotary disk can, for example, be realized in that the grating holder is fastened, for example, at the positioning slide by at least two screws. In order to achieve a rough prepositioning of a grating holder at the positioning slide at least one stop is provided at the positioning slide, to which a grating holder can be brought. Hereby, at least a rough agreement, for example, between the thread bores at the positioning slide and the screw holes at the grating holder can result.

In a further design of the grating-changing apparatus in accordance with the invention, with a motor-driven setup for the positioning slide that is designed as carriage with respect to the base and thus in particular in a motor-driven actuation of the previously cited threaded spindle, end position switches can be provided in order to electrically limit the displacement path. Here, for example, an upper and a lower end position switch can be activated in the case of a displacement by the same grating holder, which is especially advantageous when only two grating holders are fastened on the positioning slide that is designed as carriage.

Further, the grating-changing apparatus in accordance with the invention can comprise a controller or control means for commanding the motor-driven actuation, in particular of the threaded spindle. Such a control can, for example, occur by means of a data-processing system that actuates a motor, for example, a stepping motor. Thus, a user can, for example, by means of inputting information into the control, cause an automatic movement of the positioning slide and thus move a different grating into the working position, for example, to achieve a switching of the frequency range of a laser resonator.

Hence, the controller is set up to effect a changing of the apparatus control as the result or an actuation of the end position switch. In a laser, for example, a changing of its frequency tuning can be brought about. Such a changing of the laser control, for example in a frequency tuning can, for example, mean that for an adjustment of the wavelength of the laser in the case of a newly inserted grating, a different number of steps is selected when the angle of an optical element that influences the wavelength, for example, a grating for this wavelength tuning is adjusted with a step motor, for example. Depending on the end position switch actuation, different initialization data for the control can also be loaded, in particular generate such a previously cited change.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
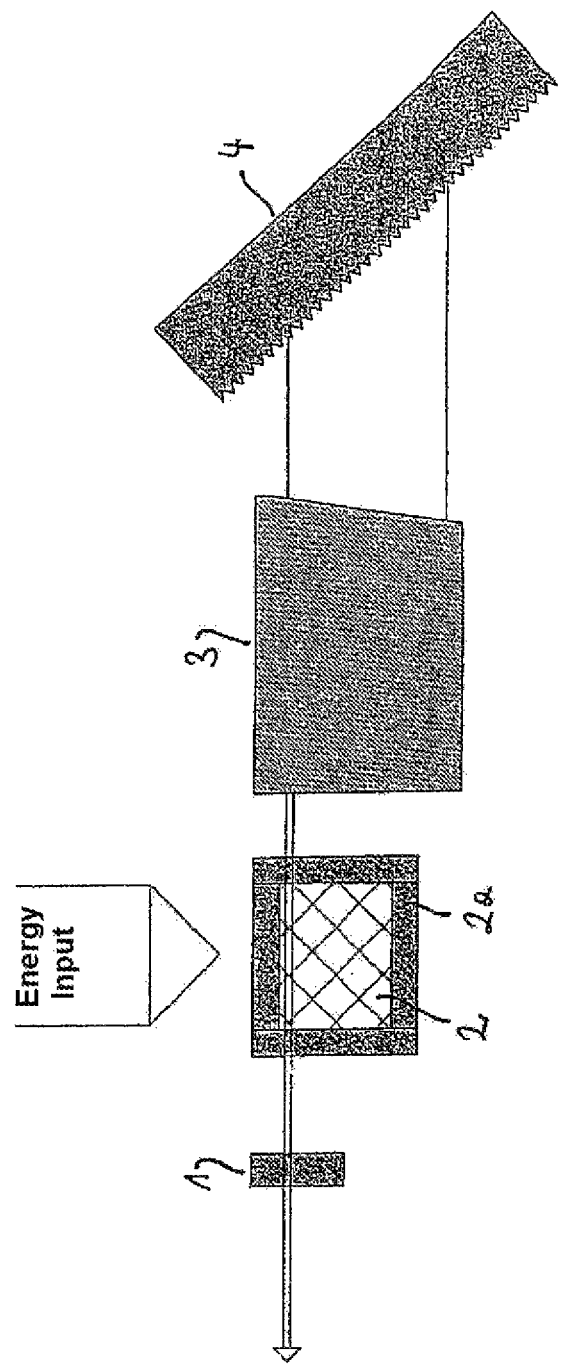
FIG. 1 is a schematic view of a laser resonator with a single grating for determining wavelength.

As seen in FIG. 1 a laser resonator has an output mirror 1, an active medium 2 that has, for example, dye in a cuvette 2a and is pumped optically perpendicular to its laser direction. In the resonator, a beam widener 3 can optionally be provided in order to illuminate the entire length of a grating 4. In the Littrow configuration of the grating 4 that is shown here, the light diffracted back into the laser resonator is tuned in wavelength by changing the angle between the laser beam and the grating 4.

Figure 2:
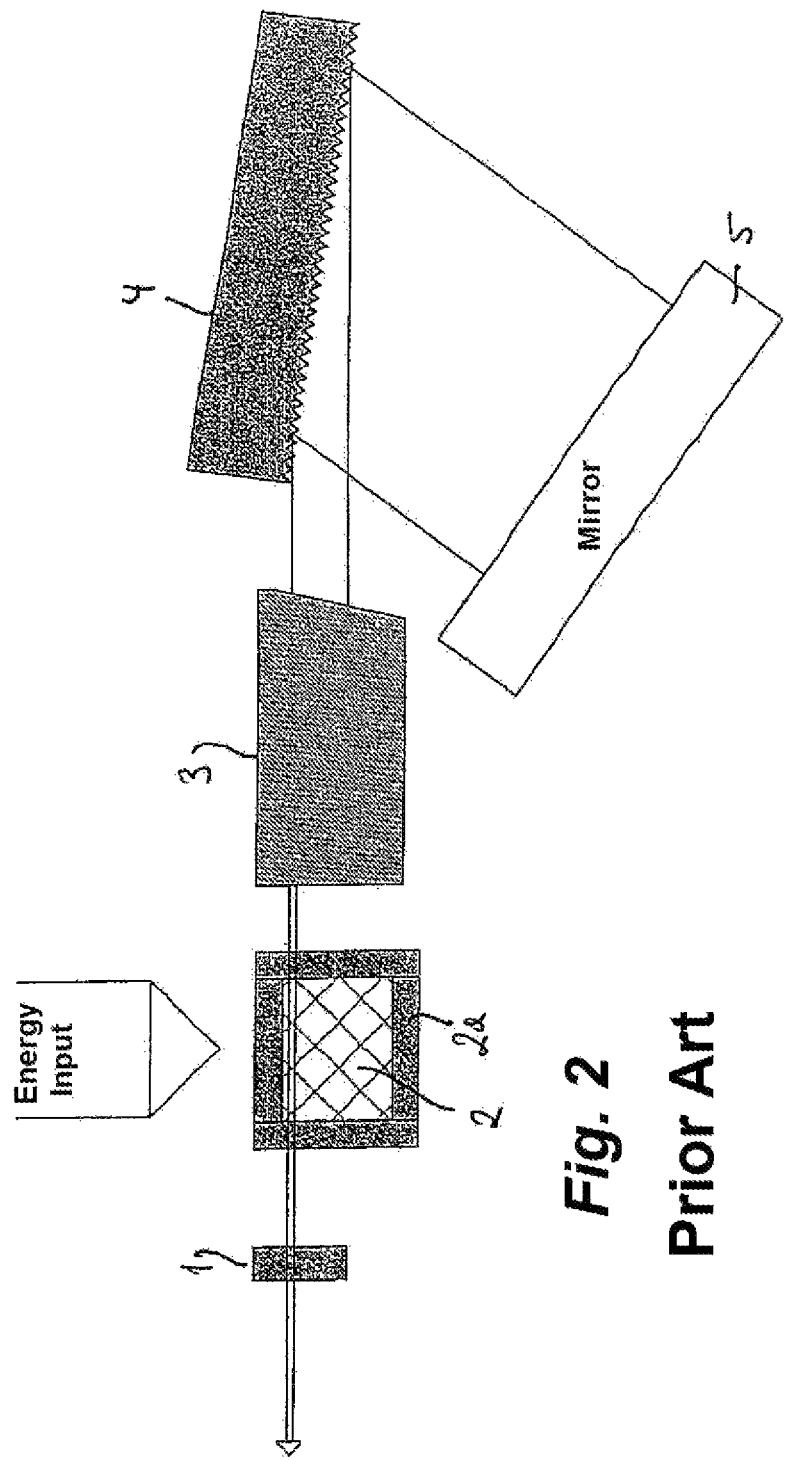
FIG. 2 is a similar view of a laser resonator with a grating subject to grazing light incidence and a reflecting mirror.

In contrast, FIG. 2 shows a slightly different structure in which a grating 4 is operated with grazing incidence and a diffraction configuration of grating 4 is reflected back through a mirror 5 into the light path. Here, by means of changing the angle of the mirror 5, a tuning of the wavelength can take place.

Figure 3:
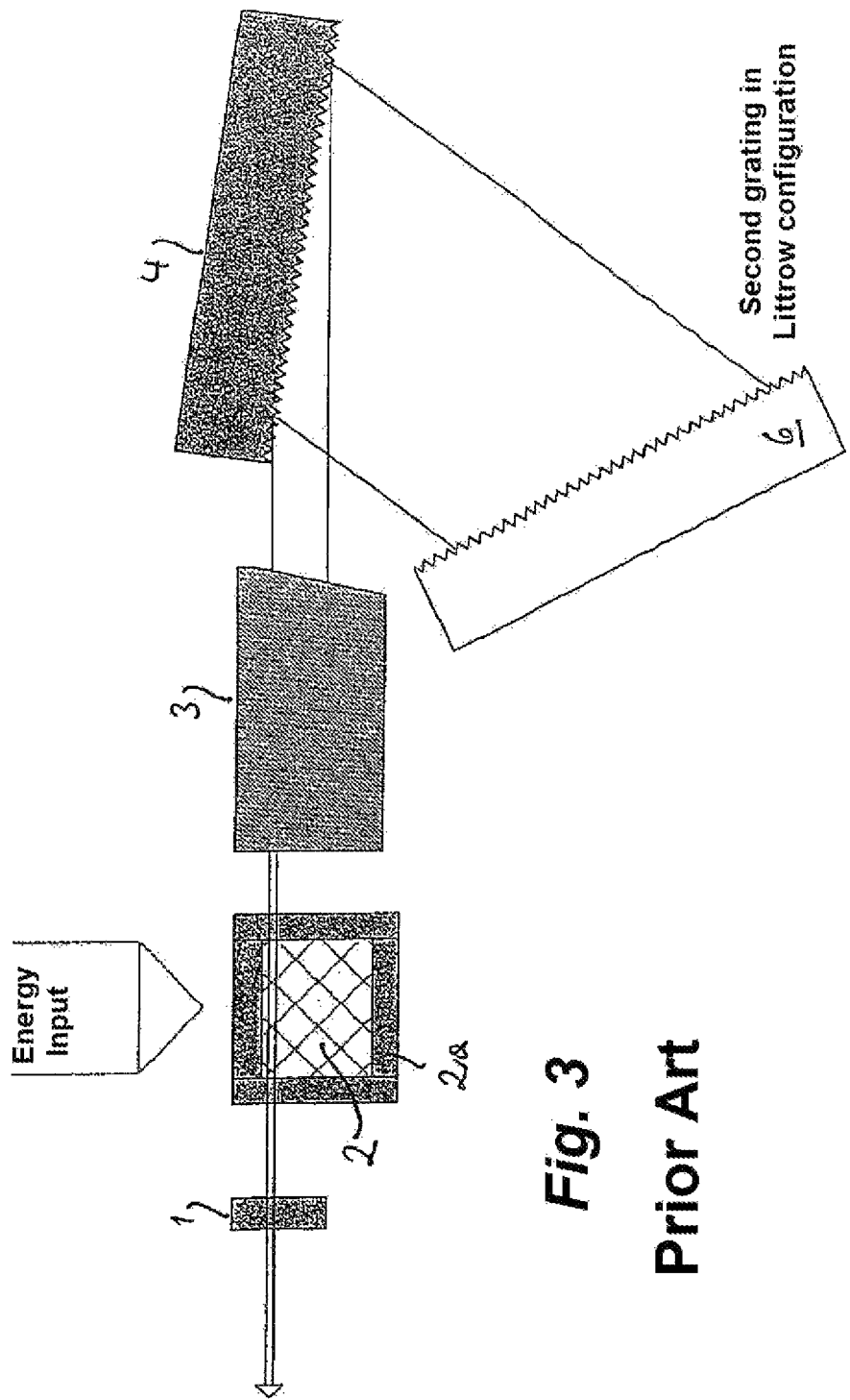
FIG. 3 is a similar view of a laser resonator with a first grating operated subject to grazing light incidence and a second grating in Littrow configuration for wavelength tuning.

By comparison, FIG. 3 in turn shows an embodiment that is changed further, where a first grating 4 is operated with grazing incidence and the light diffracted by this grating 4 is diffracted back through a second grating 6 in a Littrow configuration onto the grating 4. By means of this double grating configuration, in particular, a very narrow spectral line width results. Here, wavelength tuning can occur by changing the angle of the grating 6.

All of these resonator configurations are known in the prior art in principle and have the problem that a specific gratings for the spectral range that is being used must be selected so that that grating changes become necessary when the wavelength to be used with the laser is changed.

Here, the grating-changing apparatus in accordance with the invention can be used, for example, in order to be able to use various types of the gratings 4 according to the resonator setup 1-3 or in order to use various gratings 6 in the resonator configuration according to FIG. 3 in one and the same laser resonator, in particular without requiring additional alignment when the gratings are changed.

The embodiments of the invention further described in the following are not only usable in these previously cited applications of FIGS. 1 to 3, but fundamentally also in any optical application.

Figure 4:
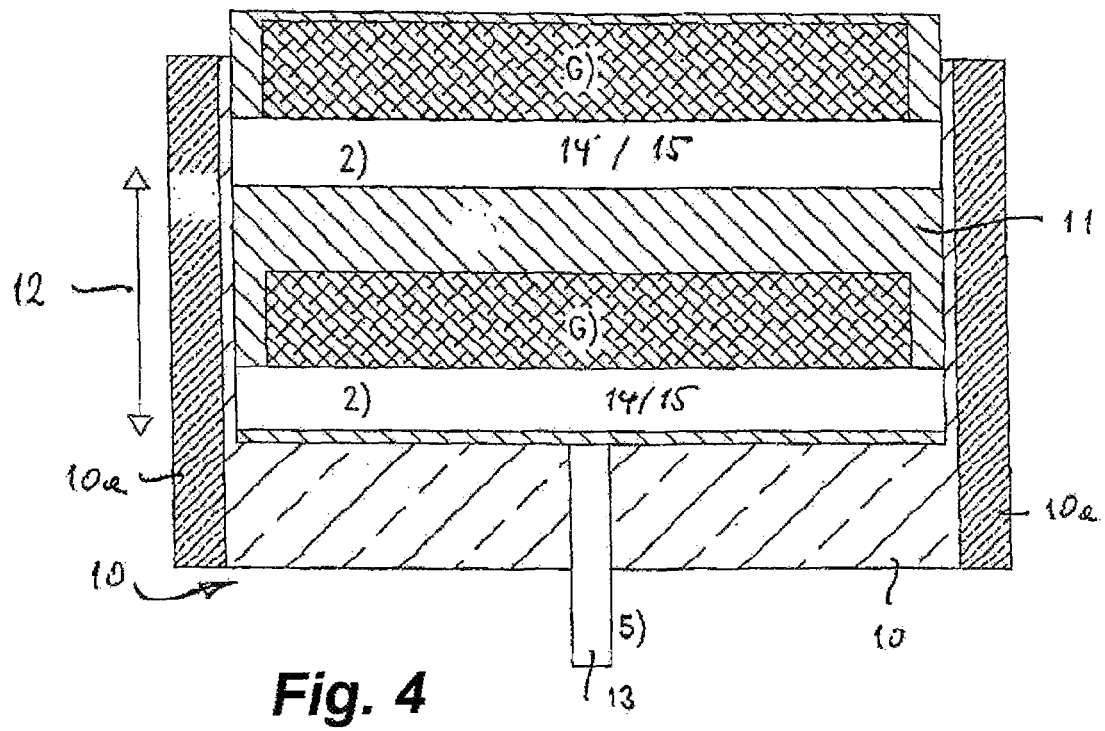
FIG. 4 is a vertical section through a grating-changing apparatus in accordance with the invention.

In a schematic overview, FIG. 4 shows a grating changer in accordance with the invention. Here, a U-shaped base 10 can be seen that has vertical guides 10a flanking a positioning slide 11 that can be moved along the guides 10a relative to the base 10 in the direction of arrow 12.

The slide 11 is actuated by a spindle 13 that can be rotated manually or by a motor. The positioning slide 11 carries grating holders 14 one above the other, each of the grating holders 14 having a respective lower grating platform 15 that can be shifted horizontally with at least two degrees of freedom relative to the positioning slide 11 and thus also simultaneously with respect to the base 10. Each of these grating platforms 15 holds a respective grating G, here shown schematically. The actuating spindle 13 can shift each of the two gratings G into a desired working position. This way, the working position can be anywhere along the displacement path.

Figure 5:
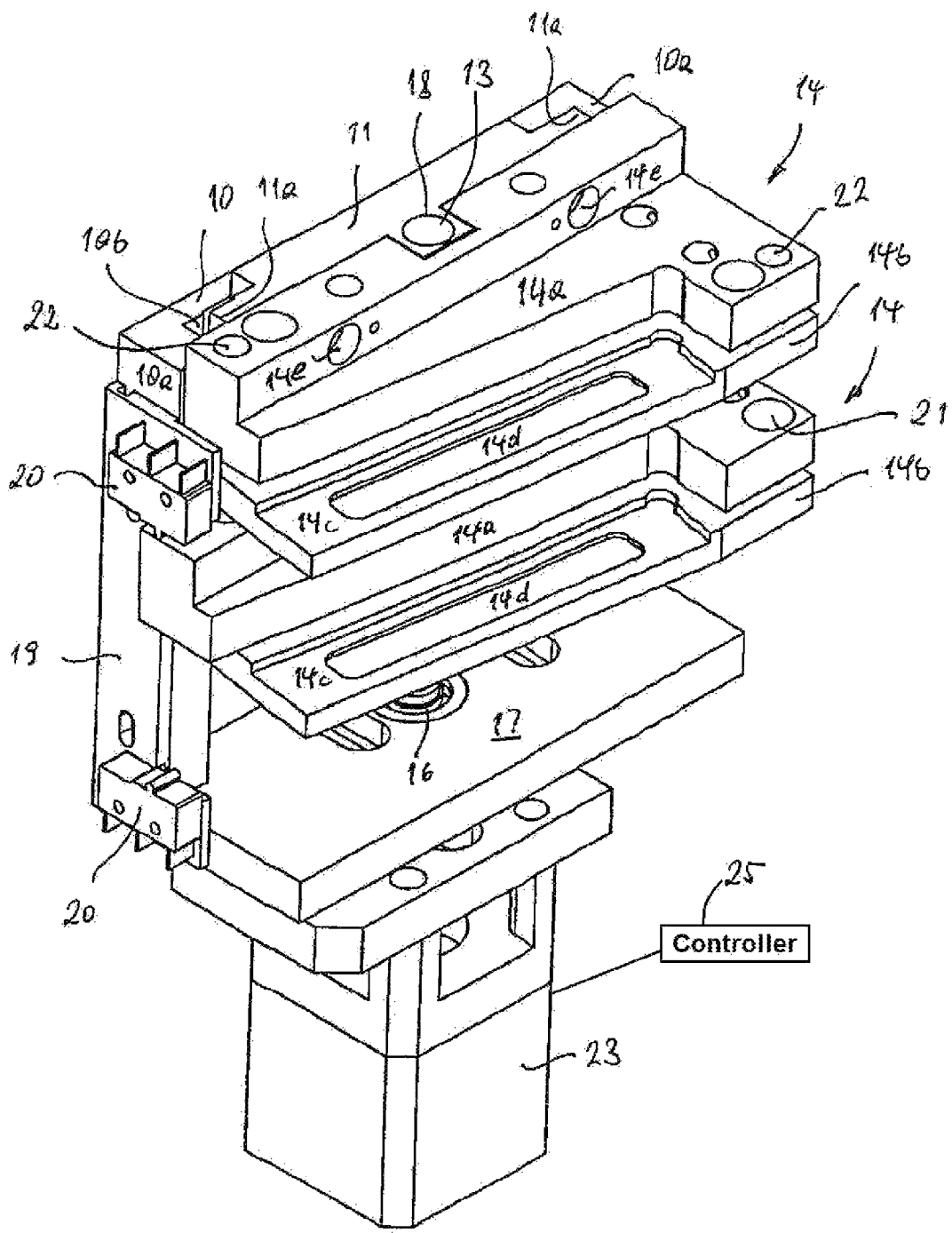
FIG. 5 is a perspective view of the grating-changing apparatus according to FIG. 4.

FIG. 5 shows a specific embodiment of this grating-changing apparatus in accordance with the invention, as shown schematically in FIG. 4.

Here, the base 10 can be seen with its guides 10a on both sides. The positioning slide or carriage 11 is located between these guides 10a, regions 10b between the guides 10a of the base 10 and the carriage 11 accommodating unillustrated straight-line guides.

Here, the straight-line guide can, for example be constructed such that on an inner face of each of the guides 10a and on an opposite outer face 11a of the carriage 11, are grooves that extend parallel to and face each other, and in the pairs of opposing grooves are balls held in an elongated ball cage. The slide 11 can accordingly roll along the guides 10 relative to the base 10.

Here, the movement is effected by the spindle 13 that is not shown in FIG. 5 and that is rotatable in a bearing 16 and a bearing plate 17 that are mounted on the base 10, and extends in the direction of displacement, here vertically. The unillustrated spindle can be rotated by a motor 23 about its axis while being axially retained in the bearing 16. A bore 18 in the carriage 11 holds a threaded bushing into which the threaded spindle 13 engages with its external screwthread, so that the spindle rotation shifts the threaded bushing and thus the entire carriage 11 longitudinally of the spindle 13. It is also possible for the carriage 11 to be formed directly with an internal thread coacting with the spindle 13.

In the embodiment shown here, the bore 18 is located in a projection that projects horizontally from the carriage 11 and vertically along its full travel path. This bore 18 can house the spindle that extends through the unillustrated threaded bushing.

Here, two of the grating holders 14 are mounted on the carriage 11 and each have two parts 14a and 14b. The part 14a, is firmly connected with the carriage 11, here, for example, by screws set in screw holes 14e, and this part 14a carries a respective grating platform 14b that can be aligned with two degrees of freedom. Here, the adjustability is achieved in that the grating platforms 14b are mounted at three points on the respective parts 14a that lie above them. At least two of these points can be adjusted by respective screws for position adjustment. Thus, for example, the angle of a grating support face 14c (in particular relative to the horizontal) can be changed within two degrees of freedom in order to be able to align an unillustrated grating fastened to this grating support face 14c in its orientation in a laser resonator and also in other applications.

The grating support face 14c are recessed in the respective grating platforms 14b, as a result of which here at least two vertical contact surfaces are formed against which a grating can be engaged for prepositioning. The grating support face 14c further has a central recess 14d in order to, for example, accept an adhesive, e.g. silicone for fastening a grating.

Moving the carriage 11 relative to the base 10 can shift each grating holder 14 into a working position so that each of the two gratings fastened in the respective grating holders 14 can be used without any problem in the laser resonator, preferably without any subsequent alignment when previously each of the two gratings has been optimally aligned in the working position by changing the alignment of the grating platform. Accordingly, a user can alternately use each of the gratings available in the grating-changing apparatus at any time and according to requirements. This way, instead of the two grating holders 14 shown here, several grating holders of the same construction type can also be provided.

Further, it can be seen here that at least toward one end of the grating-changing apparatus on one of the guides 10a of base 10 directly, or as shown here, by means of an intermediate plate 19, respectively one upper and one lower end switch 20 is provided, in order to limit the displacement path on electric actuation by the motor 24, when the upper or lower end position switch 20 is actuated, which can switch off the electricity supply to the motor 24 or feed a stop signal a controller 25 that operates the motor 24.

In the illustrated embodiment the lower grating holder 14 projects at one end past one of the guides 10a of the base, this projecting end being located between the two limit switches 20. The upper end position switch is accordingly actuated by an upper surface of the grating holder 14 and the lower end position switch by a lower surface of the grating holder 14.

FIG. 5 also further shows an alignment element 21 in the lower grating holder is made accessible for the purpose of alignment, in that the grating holder 14 above it has a through bore 22 that extends through the upper part 14a of the grating holder 14, as well as through the respective grating platform 14b, so that a tool such as, for example, a screwdriver or a socket wrench can be guided through the cutout, here in particular bore 22, up to the alignment element 21.

The second degree of freedom can similarly be actuated in the same way on the opposite side of the grating holders 14, in which likewise a through bore 22 has been made in the upper grating holder in order to be able to access alignment elements arranged underneath, just as in the previous case.

Figure 6:
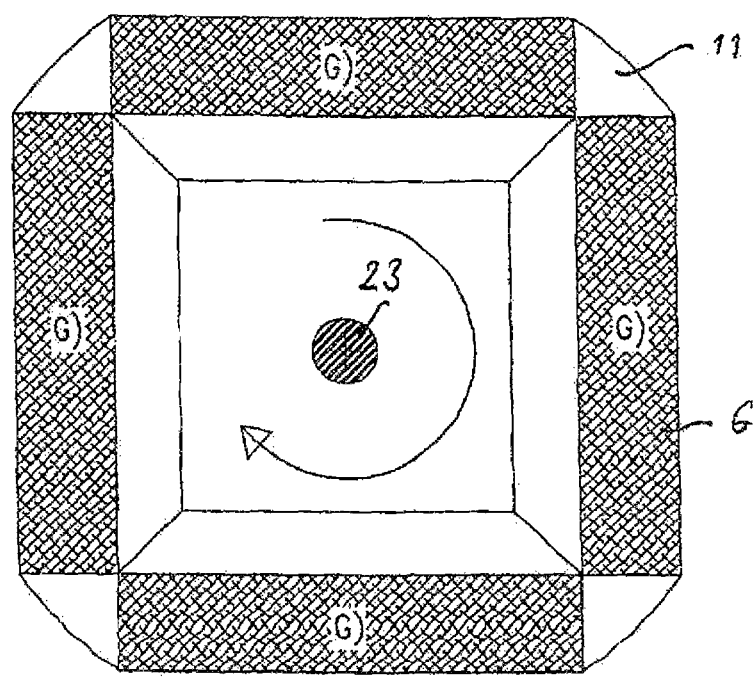
FIG. 6 is a schematic view of a second embodiment.

FIG. 6 shows an alternative embodiment in schematic form only, in which a rotary disk 11, which is the positioning slide here, can be rotated around an axis of rotation 23 with respect to a base that is not shown here. In the same way as described in FIG. 5, grating holders 14, which are not illustrated in more detail here but that each carry a respective grating G, can be arranged on the rotary disk 11, that however has in the same way, a grating platform that can be aligned within at least two degrees of freedom.

The gratings G are arranged on this platform. Here, the embodiment can be selected in such a way that the axis of rotation 23 that extends perpendicular to the surface lies in the laser resonator plane so that the optically effective grating surface with the grating lines is shown in a top view here. Rotation here in the direction of the arrow shown moves each of the individual gratings G into a working position given here, for example, by the lower or also alternatively the upper grating.

It can be seen here that after a rotation by 90°, a different grating G is rotated into the working position. As each grating is prealigned, due to the mounting on the grating platform with the two alignable degrees of freedom, the laser can continue to be operated immediately after a change of the grating.

I claim:

1. An apparatus usable with a laser resonator and at least two diffraction gratings, the apparatus comprising:
   a generally stationary base;
   a guide on the base defining a vertical straight-line adjustment direction;
   a grating-positioning slide carried on the guide and shiftable in the guide in the straight-line adjustment direction;
   respective holders carried on the slide one above the other and each having a horizontal platform adapted to secure the respective diffraction grating in a horizontal position;
   means for shifting each of the platforms and the respective gratings on the respective holder with at least two degrees of freedom relative to the respective holder; and
   means for shifting the positioning slide relative to the base in the straight-line adjustment direction for moving each of the gratings in the direction into a working position.

2. The apparatus defined in claim 1 wherein the means for shifting the positioning slide includes a spindle engaged with the base and with the slide.

3. The apparatus defined in claim 2 wherein the spindle is threadedly engaged with the slide and axially fixed in the base.

4. The apparatus defined in claim 2 wherein the means for shifting the positioning slide further includes a motor coupled to the spindle.

5. The apparatus defined in claim 4, further comprising limit switches fixed to the base for limiting operation of the motor and displacement in the direction of the slide.

6. The apparatus defined in claim 5, further comprising a controller connected to the limit switches and to the motor for operating same.

7. The apparatus defined in claim 1 wherein the base has two of the guides that are parallel, spaced apart, and flank the slide.

8. An apparatus usable with a laser resonator and at least two diffraction gratings, the apparatus comprising:
- a generally stationary base;
- two parallel and horizontally spaced guides on the base defining a vertical straight-line adjustment direction;
- a grating-positioning slide carried on and between the guides and shiftable in the guides in the straight-line adjustment direction;
- respective holders carried on the slide one above the other and each having a horizontal platform adapted to secure the respective diffraction grating in a horizontal position;
- means for shifting the positioning slide relative to the base in the straight-line adjustment direction for moving each of the gratings into a working position; and
- respective adjustment elements movable for shifting the platforms on the respective holders with at least two degrees of freedom relative to the respective holders, one of the holders being formed with a throughgoing hole through which a tool can be engaged with the adjustment element of the other holder.

* * * * *